(12) United States Patent
Blahnik et al.

(10) Patent No.: US 6,385,494 B1
(45) Date of Patent: May 7, 2002

(54) SYSTEM AND METHOD FOR PRODUCING PRODUCTION CONTROL SOFTWARE

(75) Inventors: David G. Blahnik, Metmora; Stephen J. Jackson, Peoria; Steven D. Monday, Glasford; Allen B. Peacock, Bartonville; Catherine A. Roling, Peoria; Leslie W. Johnson, Yorkville, all of IL (US); Paul M. McCarron, Twinsburg, OH (US); Bruce W. Day, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 08/720,399

(22) Filed: Sep. 30, 1996

(51) Int. Cl.$^7$ .............................................. G05B 19/42
(52) U.S. Cl. ............................ 700/86; 700/18; 700/97; 700/28; 700/87; 706/919; 706/922; 701/29; 701/102
(58) Field of Search ................................ 701/1, 26–29, 701/35, 50, 88, 206, 102, 115; 700/17, 18, 28, 75, 87, 83, 86, 95–98; 706/921, 922, 923, 919

(56) References Cited

U.S. PATENT DOCUMENTS

| | | | | |
|---|---|---|---|---|
| 4,807,108 A | * | 2/1989 | Ben-Arieh et al. | 364/148 |
| 4,827,423 A | * | 5/1989 | Beasley et al. | 364/468 |
| 5,122,717 A | * | 6/1992 | Hayashi | 318/569 |
| 5,241,465 A | * | 8/1993 | Oba et al. | 364/401 |
| 5,282,139 A | * | 1/1994 | Kobayashi | 364/468 |
| 5,408,405 A | * | 4/1995 | Mozumder et al. | 364/151 |
| 5,421,009 A | * | 5/1995 | Platt | 395/600 |
| 5,426,585 A |   | 6/1995 | Stepper et al. | 364/424.03 |
| 5,471,615 A | * | 11/1995 | Amatsu et al. | 395/200.03 |
| 5,481,712 A | * | 1/1996 | Silver et al. | 364/401 |
| 5,499,918 A | * | 3/1996 | Kline, Jr. et al. | 364/468 |
| 5,530,643 A | * | 6/1996 | Hodorowski | 364/191 |
| 5,590,045 A | * | 12/1996 | Kaak et al. | 364/470.1 |
| 5,648,898 A |   | 7/1997 | Moore-McKee et al. | 364/191 |

* cited by examiner

Primary Examiner—William Grant
Assistant Examiner—Ramesh Patel
(74) Attorney, Agent, or Firm—James R. Yee; Steven G. Kibby

(57) ABSTRACT

A method and system for producing production control software for a plurality of electronic control modules, is provided. The electronic control modules are located on production machines. Each production machine includes a subset of the electronic control modules. The system includes a part file staging area for receiving and storing new production control software from a design engineering group. A product engineering workstation is coupled to the part file staging area and operated by a product engineering user. The product engineering user can review, modify and approve the new production control software. A production staging area, coupled to the product engineering workstation, receives and stores approved production control software and receives an order for a production machine. A production workstation, coupled to the production staging area, receives the order for a production machine, determines the subset of electronic control modules located on the ordered production machine, and retrieves the production control software corresponding to the subset of electronic control modules located on the ordered production machine. The production workstation is coupled to the ordered production machine and adapted to download the production control software from the production staging area to the subset of electronic control modules located on the ordered production machine.

29 Claims, 13 Drawing Sheets

Fig - 3

| Element | Length | Format | Usage on Add | Usage on Change | Usage on Delete |
|---|---|---|---|---|---|
| Transaction Type | 3 | Character | Required | Required | Required |
| Shipping Order Number | 7 | Character | Optional | Optional | Optional |
| Prime Product Serial Number | 8 | Character | Required | Required | Required |
| Build Date | 8 | Character | Required | Required | Optional |
| Build Sequence Number | 3 | Number | Optional | Optional | Optional |
| General Arrgmnt Part Number | 10 | Character | Optional | Optional | Optional |
| General Arrgmnt Class Code | 1 | Character | Optional | Optional | Optional |
| General Arrgmnt Change Level | 4 | Character | Optional | Optional | Optional |
| Engineering Model | 10 | Character | Optional | Optional | Optional |
| Sales Model | 4 | Character | Optional | Optional | Optional |
| ECM Type | 15 | Character | Required | Required | Optional |
| ECM Part Number | 10 | Character | Required | Required | Optional |
| ECM Class Code | 1 | Character | Optional | Optional | Optional |
| ECM Change Level | 4 | Character | Required | Required | Optional |
| ECM Description | 26 | Character | Optional | Optional | Optional |
| ECM Abbr Name | 16 | Character | Optional | Optional | Optional |
| ECM Load Location | 15 | Character | Optional | Optional | Optional |
| Element Type | 15 | Character | Optional | Optional | Optional |
| Element Part Number | 10 | Character | Optional | Optional | Optional |
| Element Class Code | 1 | Character | Optional | Optional | Optional |
| Element Change Level | 4 | Character | Optional | Optional | Optional |
| Element Description | 26 | Character | Optional | Optional | Optional |
| Element Abbr Name | 16 | Character | Optional | Optional | Optional |
| Element Serial Number | 10 | Character | Optional | Optional | Optional |
| Element Destination Media | 15 | Character | Optional | Optional | Optional |

Fig-4-
| Element | Length | Format | Usage |
|---|---|---|---|
| Component Serial Number | 10 | Character | Required |
| Component Part Number | 10 | Character | Required |
| Change Level | 4 | Character | Required |
| Clutch Number | 1 | Character | Required |
| Ramp Level Command | 3 | Number | Required |
| Hold Level Current | 3 | Number | Required |
| Top Pressure Current | 3 | Number | Required |

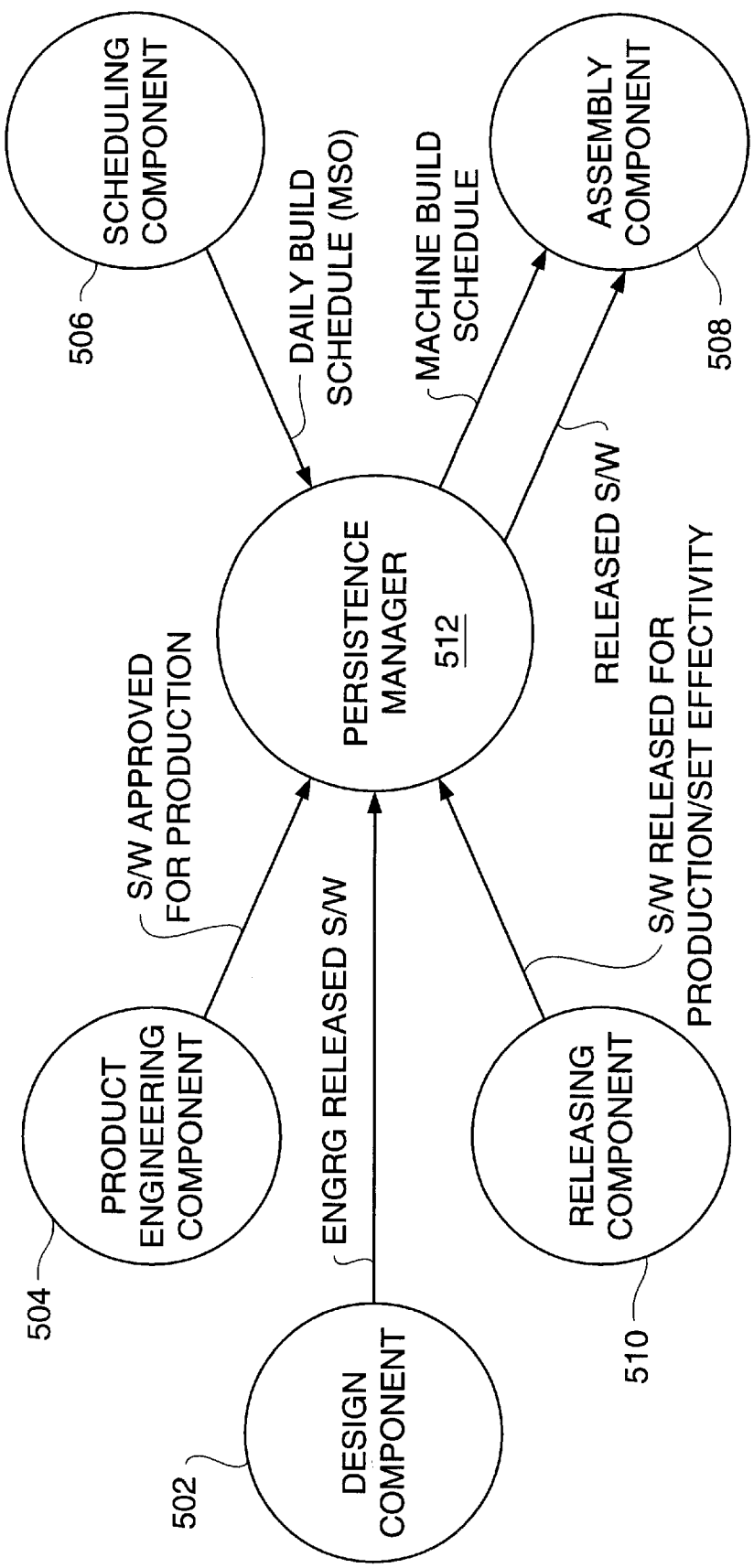

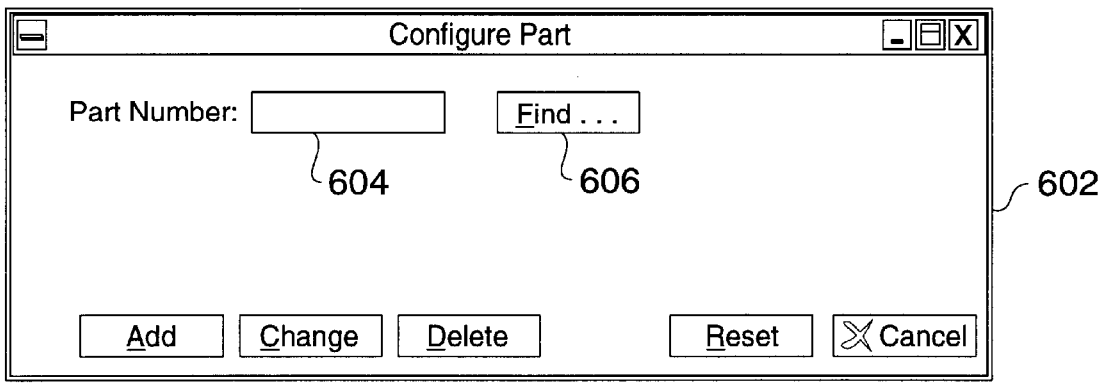
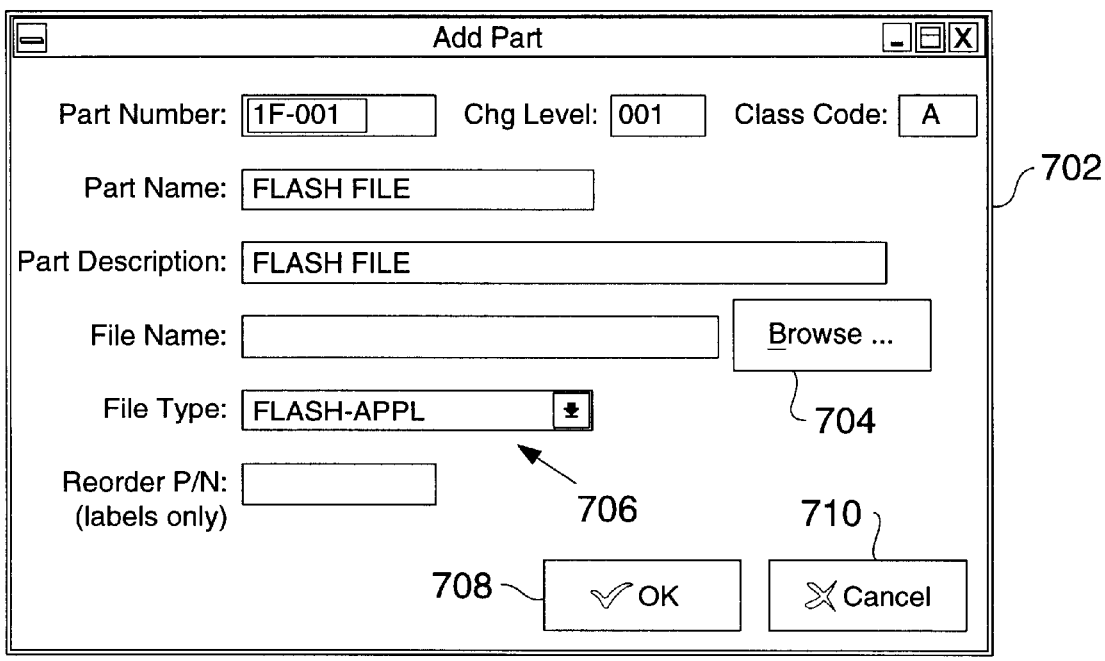

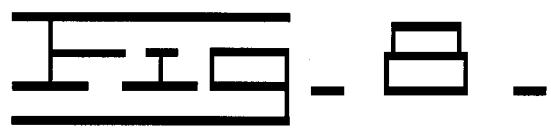
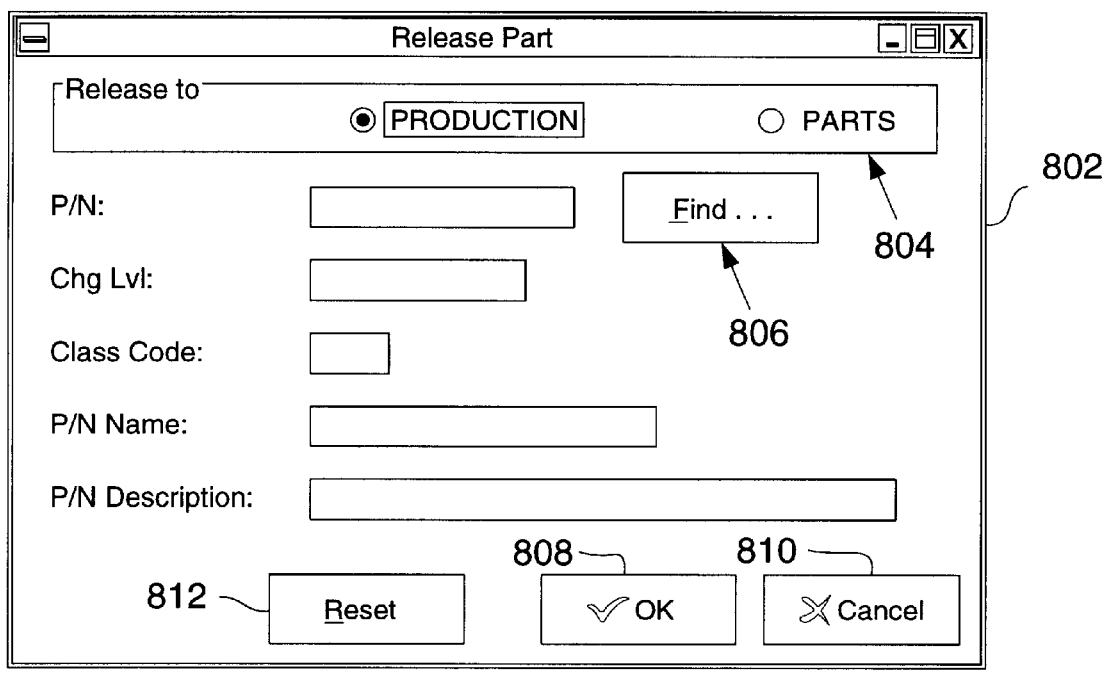

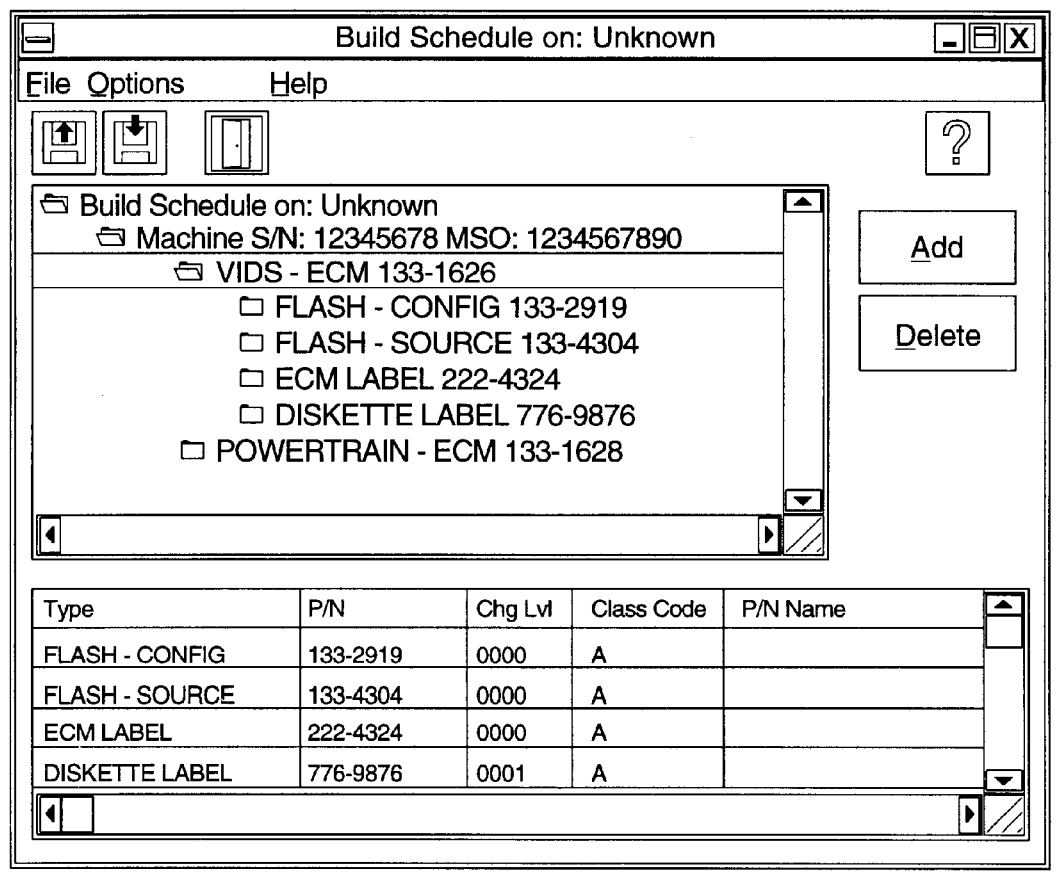

Fig_12_
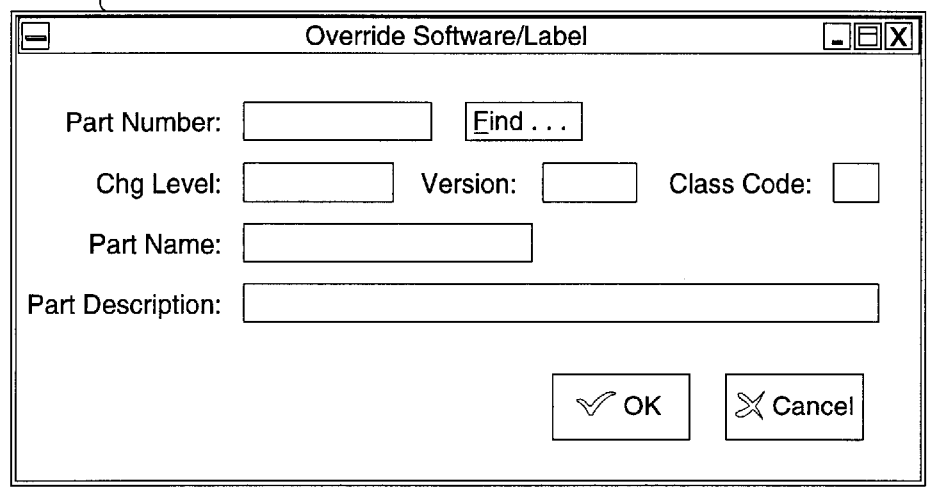
Fig_13_
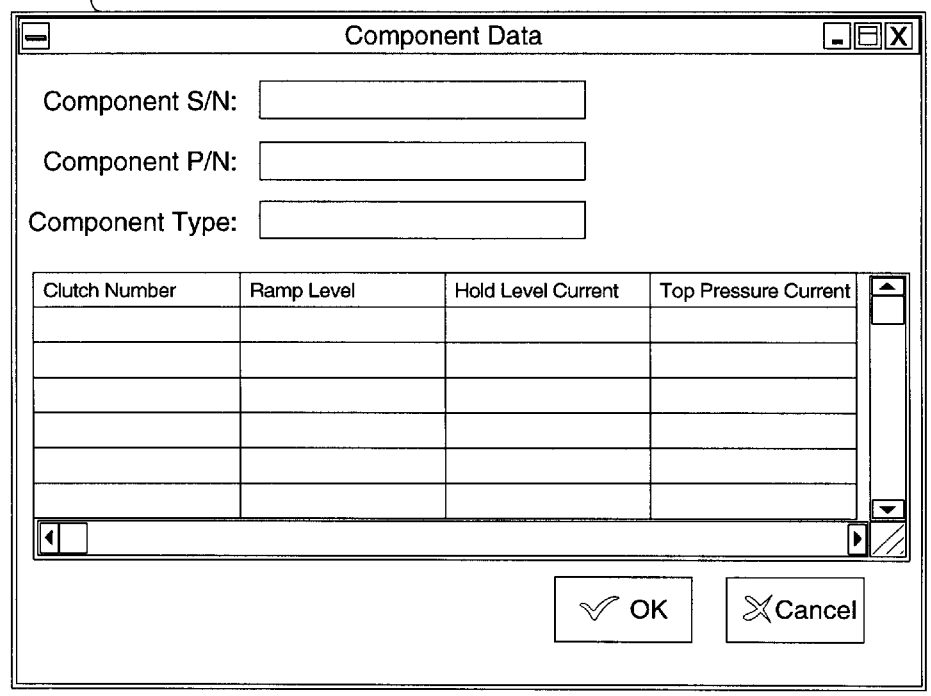

Fig. 14
1402
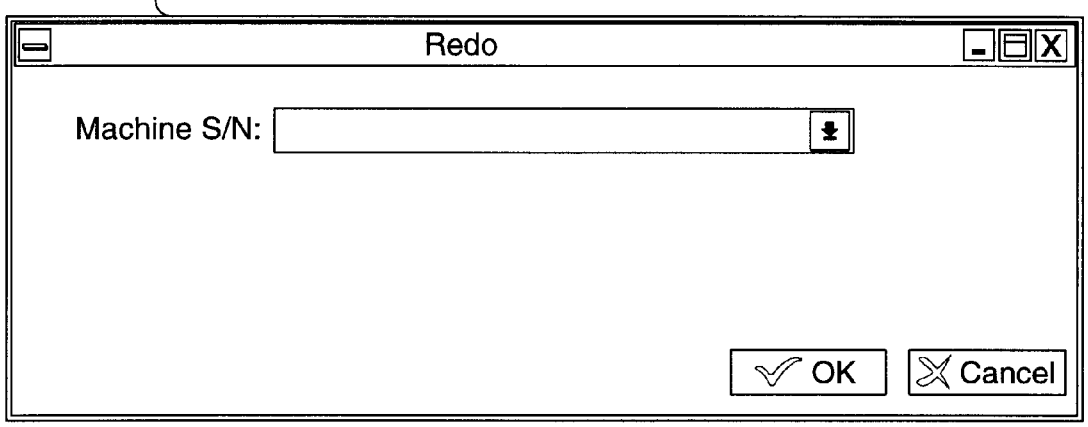

Fig_15.

SYSTEM AND METHOD FOR PRODUCING PRODUCTION CONTROL SOFTWARE

TECHNICAL BACKGROUND

The present invention relates generally to a system and method for producing control software, and more particularly, to a system and method which supplies a network of computers for processing control software from design to production.

BACKGROUND ART

Microprocessor based controllers are used increasingly in all manners of machines. Each controller on a machine may control the operation of a different machine component.

For example in the earthmoving industry, earthmoving machines typically include numerous microprocessor based controllers or electronic control modules (ECM). Typically, a separate ECM may control each of the following: an engine, a transmission, an information system, and/or a work implement system.

The ECM typically includes a computer program to be run on the microprocessor. The computer program is composed of one or more files which must be loaded onto the ECM during the production process.

There are typically several groups that are involved in the production of these software files. A design group writes and tests the computer files. A production group reviews the files and approves them for production. An assembly group downloads the correct software to each ECM.

Generally, previous systems have been manual systems. Computers files are swapped via computer disks or networks. Each group has their own process for completing their task in the chain. Typically, the assembly group must find the correct files (on a floppy disk) and use a laptop computer to connect to each ECM to download the appropriate file. This manual process is time consuming, prone to mistakes, and complex.

The present invention is aimed at solving one or more of the problems indicated above.

DISCLOSURE OF THE INVENTION

In one aspect of the present invention a system for producing production control software for a plurality of electronic control modules, is provided. The electronic control modules are located on production machines. Each production machine includes a subset of the electronic control modules. The system includes a part file staging area for receiving and storing new production control software from a design engineering group. A product engineering workstation is coupled to the part file staging area and operated by a product engineering user. The product engineering user can review, modify and approve the new production control software. A production staging area, coupled to the product engineering workstation, receives and stores approved production control software and receives an order for a production machine. A production workstation, coupled to the production staging area, receives the order for a production machine, determines the subset of electronic control modules located on the ordered production machine, and retrieves the production control software corresponding to the subset of electronic control modules located on the ordered production machine. The production workstation is coupled to the ordered production machine and adapted to download the production control software from the production staging area to the subset of electronic control modules located on the ordered production machine.

BRIEF DESCRIPTION OF THE DRAWINGS

FIG. 3 is a diagram illustrating the format of a build order file;

FIG. 4 is a diagram. illustrating the format of a component file;

FIG. 5 is a flow diagram of the present invention illustrating the components of the system of FIGS. 1 and 2;

FIG. 6 is a diagrammatical view of a Configure Part screen of the present invention;

FIG. 7 is a diagrammatical view of a Add Part screen of the present invention;

FIG. 8 is a is a diagrammatical view of a Release Part screen of the present invention;

FIG. 9 is a diagrammatical view of a Build Schedule screen of the present invention;

FIG. 12 is a diagrammatical view of a Override Software/Label screen of the present invention;

FIG. 13 is a diagrammatical view of a Component Data screen of the present invention;

FIG. 14 is a diagrammatical view of a Redo dialog of the present invention;

BEST MODE FOR CARRYING OUT THE INVENTION

A. Copyright

Portions of the disclosure of this patent document contain material which is subject to copyright protection. The copyright owner has no objection to the facsimile production by anyone of the patent document or the patent disclosure as it appears in the Patent and Trademark Office patent file or records, but otherwise reserves all copyright rights whatsoever.

B. Overview

The present invention provides a system and method embodied implement on a network of computers. Product Software Programming System (PSPS) is a software tool used for loading (flashing or downloading) production control system software into electronic control modules (ECM) on the factory floor. For example, an earthmoving machine such as a track-type tractor may include a plurality of ECM's for the purpose of controlling an engine, transmission and/or hydraulic work implements. Each ECM typically includes at least one microprocessor. The production control system software includes a computer program for each ECM.

The network of computers includes a plurality of interconnected workstations located at different locations. A workstation may include any suitable type of computer, such as a mini-computer or personal computer.

PSPS provides a staging area for design engineers to place new software control source and configuration files. Using PSPS, the product engineering group responsible for production of a machine can review the software control source and configuration files, make any necessary modifications, and establish/approve them in PSPS. Upon approval, PSPS moves the software files to a pre-production repository. From here, a releasing group reviews the files in the pre-production repository and determines the part's effective date. PSPS provides a screen to review and release the approved parts (source and configuration files, labels, etc). In addition, PSPS provides a screen to copy (via file transfer protocol or ftp) the software files to a released software staging for use in replacement parts.

Once the software has been released, it may be loaded into the ECM's on the assembly line or a subassembly line. Using information provided by the production group, PSPS displays the software configuration to be flashed for the current machine on the (sub)assembly line. Override capabilities are provided at the ECM, software, label and component levels. Each day, a file containing history information regarding the software loaded into each ECM is created in a history staging area. This information is be used by a Product Information System (PIS) to update their product records.

The specific software to be loaded on a particular ECM depends upon the specific machine ordered. A staging area is a specific directory or subdirectory located within one of the workstations.

C. First Embodiment

Figure 1:
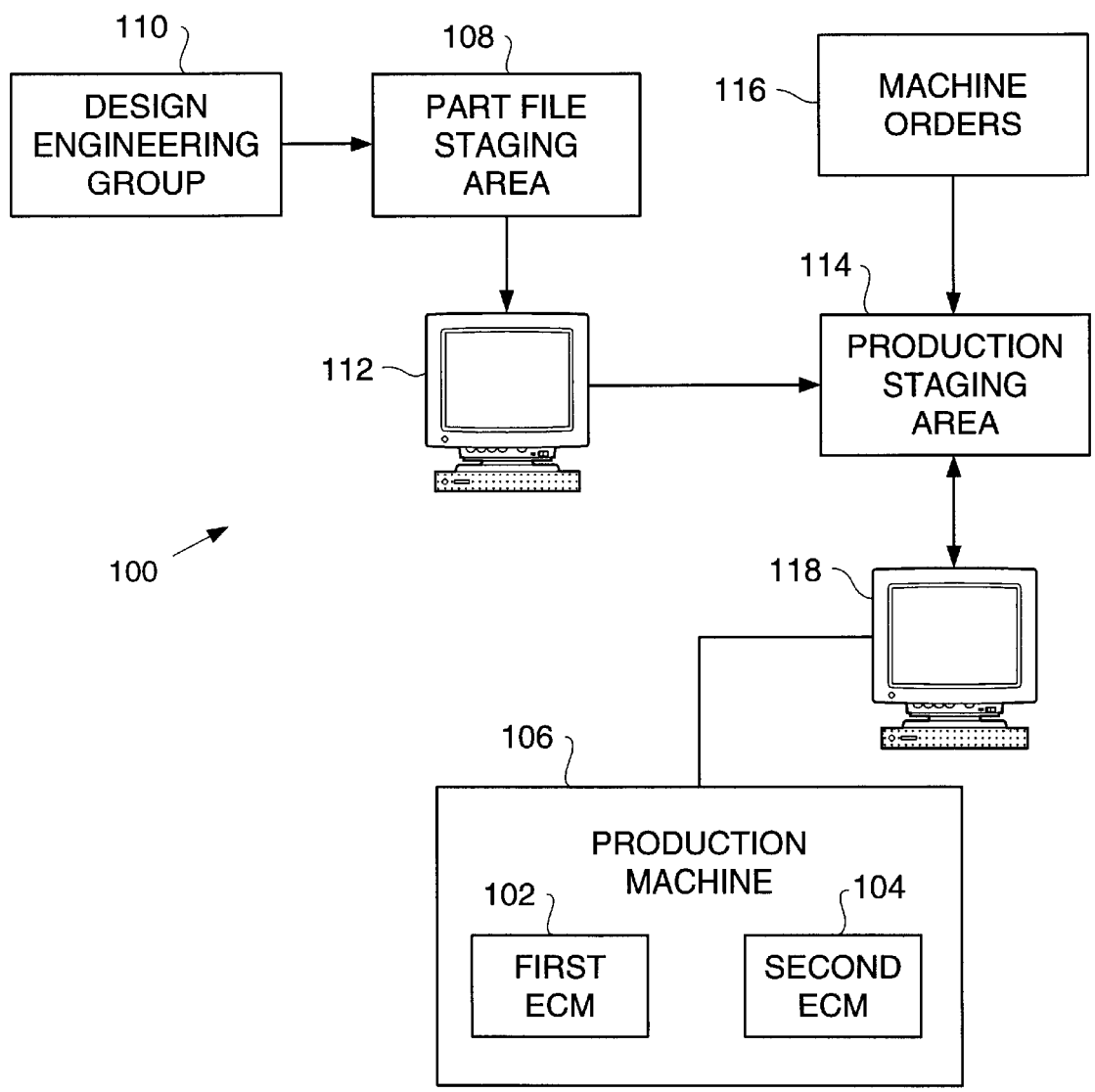
FIG. 1 is a block diagram of a system for producing production software for a plurality of electronic control modules on a production machine, according to a first embodiment of the present invention.

With reference to FIG. 1 in a first embodiment, the present invention provides a system and method 100 for producing production control software for a plurality of electronic control modules 102, 104. The electronic control modules 102, 104 are located on production machines 106. Each production machine has a subset of the electronic control modules 102, 104. The software to be loaded onto a particular ECM is dependent upon the machine type and configuration.

A part file staging area 108 receives and stores new production control software from a design engineering group 110.

A product engineering workstation 112 is coupled to the part file staging area 108. The product engineering workstation 112 is operated by a product engineering user. The product engineering user can review, modify and approve the new production control software. The product engineering workstation 112 is adapted to produce approved production control software.

A production staging area 114 is coupled to the product engineering workstation 112. The production staging area 114 receives and stores approved production control software. The production staging area 114 also receives an order 116 for a production machine 106.

A production workstation 118 is coupled to the production staging area 114. The production workstation 118 receives the order for a production machine 106, determines the subset of electronic control modules located on the ordered production machine, and retrieves the production control software corresponding to the subset of electronic control modules 102, 104 located on the ordered production machine 106. The production workstation is coupled to the ordered production machine 106 and adapted to download the production control software from the production staging area 114 to the subset of electronic control modules 102, 104 located on the ordered production machine 106.

D. Second Embodiment

Figure 2:
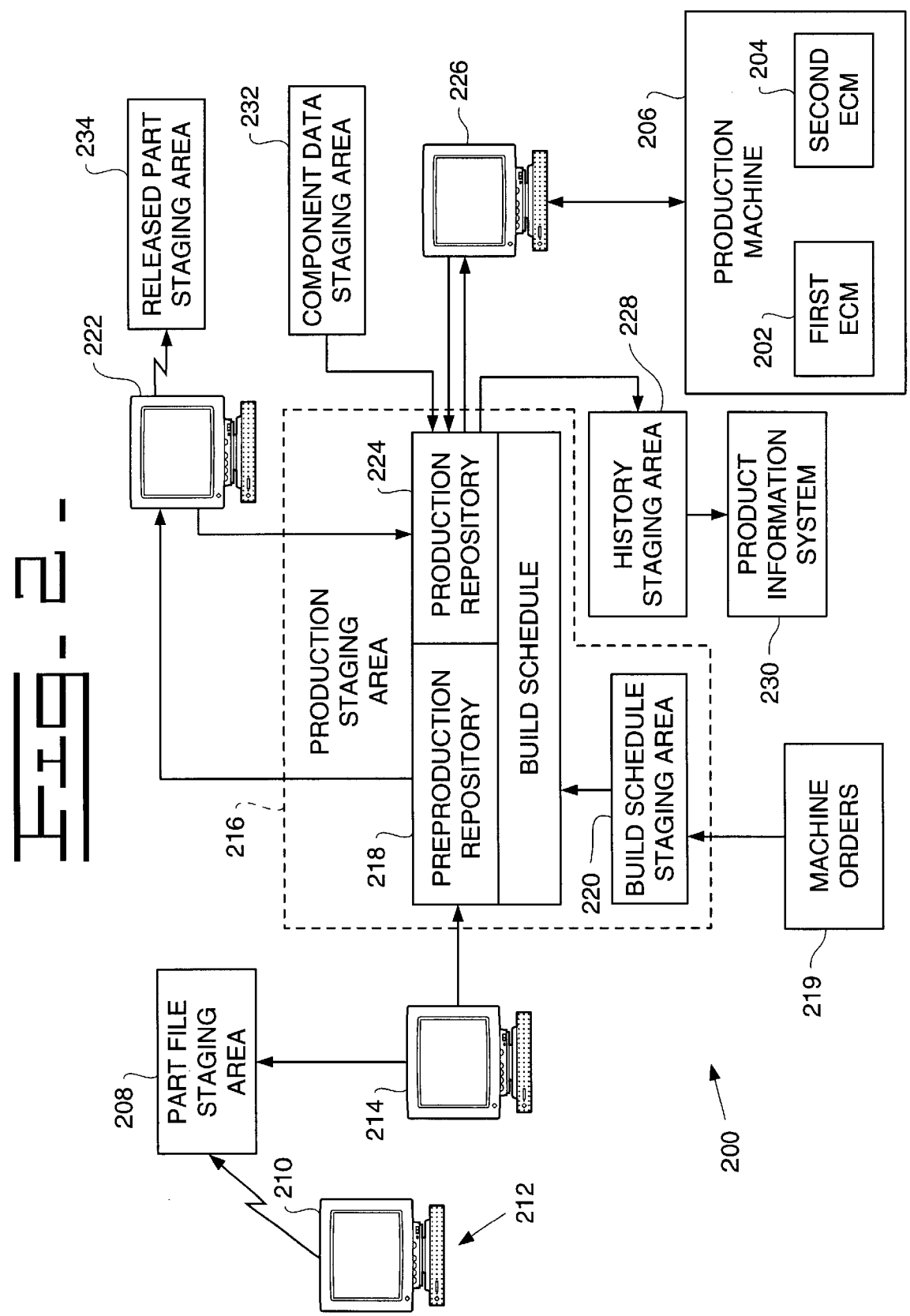
FIG. 2 is a block diagram of a system for producing production software for a plurality of electronic control modules on a production machine, according to a second embodiment of the present invention.

With reference to FIG. 2 in a second embodiment, the present invention provides a system 200 for producing production control software for a plurality of electronic control modules 202, 204. The electronic control modules 202, 204 are located on production machines 206. Each production machine 206 has a subset of the electronic control modules 202, 204. The software to be loaded onto a particular ECM is dependent upon the machine type and configuration.

A part file staging area 208 receives and stores new production control software from a design workstation 210 located at a design engineering group 212.

A product engineering workstation 214 is coupled to the part file staging area 208. The product engineering workstation 214 is operated by a product engineering user. The product engineering user can review, modify and approve the new production control software. The product engineering workstation 214 produces approved production control software.

A production staging area 216 is coupled to the product engineering workstation 214. The production staging area 216 receives and stores approved production control software in a pre-production repository 218. The production staging area 216 also receives an order 219 for a production machine and stores the order 219 in a build schedule staging area 220.

A release workstation 222 is coupled to the production staging area 216. The release workstation 222 is operated by a release user who determines an effective date of the approved control software. The release workstation 222 is adapted to copy the approved control software from the pre-production repository 218 to a production repository 224 located at the production staging area 216 on the effective date.

A production workstation 226 is coupled to the production staging area 216 and to the ordered production machine. The production workstation 226 retrieves the order 219 for a production machine from the build schedule staging area 220 and determines the subset of electronic control modules located on the ordered production machine. The production workstation 226 retrieves the production control software corresponding to the subset of electronic control modules located on the ordered production machine from the production repository 224 and downloads the production control software from the production repository to the subset of electronic control modules located on the ordered production machine.

A history staging area 228 is coupled to the production staging area 216. The history staging area 228 is adapted to receive information identifying the ordered production machine and the control software loaded onto the ECM on the ordered production machine. A Product Information System 230 retrieves the information from the history staging area 228 and stores the data in a database for later use.

A component staging area 232 contains a database of configuration files for specific components of the production machine. These configuration files are used by the production workstation 226 to determine the correct production control software for the corresponding ECM.

E. Machine Build Schedule

In the preferred embodiment, machine orders are entered into the build schedule staging area 220 using a sequential file having a format as illustrated in FIG. 3. In the preferred embodiment, the following assumptions are made:

The machine build schedule interface and the machine history interface files are processed in batch mode. The machine build schedule can also be loaded interactively.

It is the responsibility of each production facility to create the daily machine build schedule interface file (manually or automatically). A screen interface are available for manually creating/loading machine build schedules.

All PSPS file transfers are performed via file transfer protocol (ftp).

After the initial load, only the new day's build schedule and changes to the existing build schedules (in PSPS) are sent to PSPS.

If there are. any changes (transaction type='C') to an existing machine build schedule (based on Machine Serial Number), the entire machine contents must be resent.

If an existing machine in the build schedule (Machine Serial Number) needs to be deleted, only one record needs to be sent.

All machine build schedule records for a particular machine are written to a grief file and not processed if one of these conditions exists:
1. The machine (based on Machine Serial Number) already exists on an Add.
2. The machine (based on Machine Serial Number) does not exist on a Change.
3. The machine (based on Machine Serial Number) does not exists on a Delete.

If the class code passed down is blank, a class code of 'A' is used.

The part number version, prefix, and suffix are not used to distinguish a unique part.

When a machine gets assigned to a different Shipping Order Number and information still exists in PSPS for the previous Shipping Order Number (excluding history), a delete transaction for the machine with the old Shipping Order Number must be provided before the machine containing the new Shipping Order Number is added (a change transaction will also work).

All elements within a record are separated by commas. If an optional element is not filled in, the entire length of the element does not have to be used. If element contains a comma (e.g., description), place an additional comma immediately following the comma (e.g.,,). This requires there to be at least one non-comma character between empty elements (e.g.,,).

The production group is responsible for providing the sequential file which contains the build schedule for the next 3–5 days to PSPS. There is one record in the file for each software, label, or component that needs to be loaded onto an ECM in a production machine. All elements within a record are separated by commas.

Each element type of the machine build sequential file is described below.

Transaction Type—Identifies the type of transaction. Values:
'ADD'—add the machine build schedule.
'CHG'—replace the existing machine with this machine (all records for the machine must be sent).
'DEL'—delete the machine (only 1 record which contains the machine serial number must be sent).

Shipping Order Number—Identifies the machine shipping order associated with this machine.

Prime Product Serial Number—Identifies the serial number associated with this machine.

Build Date—Identifies the date that this machine is scheduled to be built. The date should be provided in YYYYMMDD format where YYYY is the year, MM is the numeric month number, and DD is the day of the month.

Build Sequence Number—Identifies the build sequence within the build date (e.g., 001 is used for the first machine on each day's build schedule). If a build sequence number of 000 is specified, PSPS assigns a sequence number of 999 and displays this machine at the end of the machine list.

General Arrgmnt Part Number—Identifies the unique part number associated with the machine. This information is displayed on the shop floor display if provided.

General Arrgmnt Class Code—Identifies the class of part to which the machine belongs. This information is used to format the display of the General Arrgmnt Part Number.

General Arrgmnt Change Level—Identifies the part number change level associated with the machine. This information is displayed on the shop floor display if provided.

Engineering Model—Identifies the engineering model associated with the machine. This information is displayed on the shop floor display if provided.

Sales Model—Identifies the sales model associated with the machine. This information is displayed on the shop floor display if provided.

ECM Type—Identifies the type of Electronic Control Module (ECM) on the machine. Values:
'ENGINE'
'IMPLEMENT'
'POWERTRAIN'
'SERVICE GROUP'
'VIDS' or 'VIMS' (an information monitor).

ECM Part Number—Identifies the unique part number associated with the ECM or Service Group or Service Group.

ECM Class Code—Identifies the class of part to which the ECM or Service Group belongs or Service Group belongs.

ECM Change Level—Identifies the part number change level associated with the ECM or Service Group or Service Group.

ECM Description—Identifies the part description associated with the ECM or Service Group or Service Group. This information is used to update the part description on the database if provided.

ECM Abbr Name—Identifies the abbreviated description associated with the ECM or Service Group or Service Group. This information is used to update the part abbreviated description on the database if provided.

ECM Load Location—Identifies the location (defined in PSPS preferences file at each assembly location) that the ECM or Service Group or Service Group is loaded at. If this field is blank, the machine is displayed to the assembly operator at all locations.

Element Type—Identifies the type of software, component, or label to load on the ECM. This information is required UNLESS the ECM Type is 'SERVICE GROUP'. Values:
'FLASH—CONFIG'—VIMS or VIDS configuration file
'ECM LABEL'—label for the ECM
'DISKETTE LABEL'—diskette label
'FLASH—APPL'—flash file
'INJECTOR'—component that has component data 'FLASH—SOURCE'—VIMS or VIDS source file 'TRANSMISSION'—component that has component data Element Part Number—Identifies the unique part number associated with the software, component, or label. This information is required unless the ECM Type is 'SERVICE GROUP'.

Element Class Code—Identifies the class of part to which the software, component, or label belongs.

Element Change Level—Identifies the part number change level associated with the software, component, or label. This information is required unless the ECM Type is 'SERVICE GROUP'.

Element Description—Identifies the part description associated with the software, component, or label. This information is used to update the part description on the database if provided.

Element Abbr Name—Identifies the abbreviated description associated with the software, component, or label. This information is used to update the part abbreviated description on the database if provided.

Element Serial Number—Identifies the unique serial number associated with the component. This element is only required when the record contains component information for the ECM (e.g. Element type is 'TRANSMISSION' or 'INJECTOR'). This information field is ignored if the ECM Type is 'SERVICE GROUP'.

Element Destination Media—Identifies the destination media for the element.

F. History Staging Area

PSPS provides a sequential file to the history staging area 228 which contains load history information needed by Product Information System (PIS). The file is created once a day and contains the load history not previously reported to PIS. All elements within a record are separated by commas. Each element type of the load history record is described below.

Prime Product Serial Number—Identifies the unique number associated to the machine.

Related Product Serial Number—Identifies the unique number associated with the ECM.

Product Reference Number—Identifies the part number of the ECM or software loaded onto the ECM.

Change Level—Identifies the part number change level associated with the Product Reference Number.

Abbr Product Reference Description—Identifies the part number description of the Product Reference Number.

Product Reference Class Code—Identifies the class of part to which the Product Reference Number belongs.

Install Indicator—Identifies the type of installation.

Sequence Number—Identifies the type of record e.g., ECM record or software record.

Data Source Indicator—Identifies the source of the data

G. Component Data Staging Area

As discussed above, the component staging area 232 contains a database of configuration files for specific components of the production machine. These configuration files are used by the production workstation 226 to determine the correct production control software for the corresponding ECM. The format of the component data record is dependent upon the type of production machine being produced and the components included on the machine. With reference to FIG. 4, the format of a component data record for a transmission is shown for illustrative purposes only.

The production group is responsible for providing one or more sequential files which contain the transmission component data to PSPS. There should be one record in the file for each clutch. All elements within a record are separated by commas. Each element type of the transmission component data is described below.

Component Serial Number—Identifies the unique serial number associated with the component.

Component Part Number—Identifies the unique part number associated with the component.

Change Level—Identifies the part number change level associated with the component.

Clutch Number—Identifies the unique number associated with the clutch.

Ramp Level Command—Identifies the ramp level command associated with the clutch.

Hold Level Current—Identifies the hold level command associated with the clutch.

Top Pressure Current—Identifies the top pressure current associated with the clutch.

H. Data Base Tables

In the preferred embodiment, PSPS uses a relational database to store the majority of information. Database access is provided via open database connectivity compliant software.

I. Staging Areas

There are a number of staging areas used as information transfer points by PSPS. It is from these staging areas that PSPS brings in information needed by PSPS or sends out information needed by other systems. In the preferred embodiment, the staging areas are comprised of one or more directories which contain software or label part files. The directory to which a particular type of software or label part file is saved is configurable by the software or label type in a DirectoryInfo table in the database.

A brief description of the available types of files stored in the Staging Areas are provided below.

Source Files—ECM's which contain VIMS or VIDS require a source and configuration file. The directory that contains the source files is configured in the DirectoryInfo database table with a DirectoryType of SOURCE.

Configuration Files—ECM's which contain VIMS or VIDS require a source and configuration file. The directory that contains the configuration files is configured in the DirectoryInfo database table with a DirectoryType of CONFIGURATION.

Flash Files—ECM's which contain IMPLEMENT or POWERTRAIN require a single flash file. The directory that contains the flash files is configured in the DirectoryInfo database table with a DirectoryType of FLASH.

ECM Labels—ECM's which require PSPS to print a label require a label format file. The directory that contains the label format files is configured in the DirectoryInfo database table with a DirectoryType of ECMLABEL.

Diskette Labels—ECM's which require PSPS to print a diskette label require a label format file. The directory that contains the label format files is configured in the DirectoryInfo database table with a DirectoryType of DISKETTELABEL.

Settings Files—Settings files provide the ability for password enabled features. The directory that contains the settings files is configured in the DirectoryInfo database table with a DirectoryType of SETTINGS.

A brief description of the staging areas and there associated type are provided below.

Part File Staging—The part file staging area contains part files sent by the design group for review by the production group's Product Engineering group. PSPS looks for new part files in the directory configured in the DirectoryInfo database table with a DirectoryType of NEWPART.

Released Part Staging—The released part staging area will contain part files released to a Replacement Parts Group by Production Group's Releasing group. This directory is configured in the DirectoryInfo database table with a DirectoryType of RELEASEDPART.

Build Schedule Staging—The build schedule staging area contains build schedule files provided by the Production Group's Scheduling group. This directory is configured in the DirectoryInfo database table with a DirectoryType of BLDSCHEDULE.

Component Data Staging—The component data file staging area contains component calibration files provided by the Production Group. This directory is configured in the DirectoryInfo database table with a DirectoryType of COMPONENTDATA.

Load History Staging—The load history staging area is a directory located on an IBM mainframe computer where PSPS can place load history files for use by the Product Information System (PIS) to maintain a machine's contents. This directory is configured in the DirectoryInfo database table with a DirectoryType of LOADHISTORY.

Obsolete Part Staging—The obsolete part staging area is a directory where PSPS can place deleted part files. Thisdirectory is configured in the DirectoryInfo database table with a DirectoryType of OBSOLETE. It is the responsibility of the Production Group to delete and archive part files from this directory.

J. System Design

With reference to FIG. 5, the overall system design for the Product Software Programming System will now be discussed. The system interaction diagram in FIG. 5 illustrates the interplay of PSPS components at a very high level. Each component on the system interaction diagram (Design Engineering) is broken down into a framework interaction diagram. In the preferred embodiment, PSPS includes a Design Component 502, a Product Engineering Component 504, a Scheduling Component 506, an Assembly Component 508, a Releasing Component 510, and a Persistence Manager 512.

A framework interaction diagram depicts the communication performed between the frameworks needed to accomplish the tasks performed by the component (e.g., the frameworks needed to perform all the tasks performed by Assembly). Each of the frameworks except the Design Engineering Component 502 contained on the framework interaction diagram are discussed below in more detail. The Design Engineering component is not broken down further because it only involves an ftp script to transfer the new part files to a staging area at the facility.

1. Design Engineering Component 502

With reference to FIG. 6, upon selection of the Configure Part option from the main menu, PSPS displays a screen 602 which allows the production engineering operator or user to enter a part number or a piece of a part number in a part number entry field 604 and click on the Find action button 606. PSPS displays a list of parts which match the part number entered. If the part number field was left blank, PSPS displays a list of all available parts.

If the operator is going to perform an add, the selection of a part number is optional. If the operator wishes to perform a change or delete, a part number must be selected,before continuing. Upon selection of the Add, Change, or Delete action button, PSPS displays a screen which contains more information about the part selected.

With reference to FIG. 7, if an add or change action was selected, the operator may edit the information on the screen 702. The operator can select the part file to associate with the part number by clicking on the Browse action button 704. Part information appears in the data fields 706. Once editing of the part information has been completed, the operator may confirm the addition or modification by clicking on the OK action button 708. To exit the screen 702 without adding or changing the part information, the operator can click on the Cancel action button 710. Once a part has been released to production, only the part name, description, and class code may be changed.

If the delete action was selected, the operator is only be able to confirm the deletion by clicking on the OK action button or exit without deleting the part by clicking on the Cancel action button. Part files which are used in the current build schedule can not be deleted. Deleted part files are moved to an obsolete directory which is maintained by the business unit.

Before PSPS can load software into an ECM, the part number and part file must be established in the system and the part must be released. In order to create (or establish) a part in PSPS, the product engineering operator must be configured with a role which allows part configuration. To create a new part, the operator must click on the Configure Part icon or select Configure Part from the Tools menu on the PSPS main screen).

When creating a part, the operator may either enter all the information manually or to enter a part, press the Find action button, select a part, and update the part information. If the operator elects to manually enter all of the information, he/she can immediately click on the Add action button. If the operator wishes to make edits to existing part, he/she must enter the part number and click on the Find action button before clicking on the Add action button. PSPS displays a list of parts and allows the operator to select the desired part. At this point, the operator may click on the Add action button to perform the modifications to the part. When the Add action button is selected, PSPS displays a screen containing the selected part information or blanks if a part number was not selected.

In order to retrieve the associated part file from the part file staging area 208, the operator must click on the Browse action button. PSPS allows the production engineering operator to select a file from a list of files contained in the part file staging area 208.

After the operator has entered or updated the part information and selected the associated part file from the new part staging directory, he/she should click on the OK action button to create the part. PSPS then copies the part file from the part file staging area 208 to the pre-production repository 218.

Upon successfully copying the file, PSPS deletes the file from the part file staging area. The production engineering operator is notified whether the attempt to create the part is successful. If not successful, the operator is notified where the error occurred.

PSPS does not allow the operator to create a part (part number/change level/version) which already exists in the database.

Once the part number and part file have been established in PSPS, the part number information may be changed. After the part has been released, only the part name and description may be modified. In order to change a part in PSPS, the operator must be configured with a role which allows part configuration. To change a part, the operator must click on the Configure Part icon or select Configure Part from the Tools menu on the main screen.

To change part information, the operator must enter a part number and click on a Find action button. Once the operator has selected Find, PSPS displays a list of parts and allows the operator to select the desired part. After selecting a part, the production engineering operator will click on the Change action button to modify the part. PSPS displays a screen which contains the part information for the selected part to the operator.

After the production engineering operator has updated the part information and/or selected a new part file from the part file staging area 208, he/she should click on the OK action button to update the part information. PSPS updates the part file with the information entered by the operator.

If the part file information changed, PSPS copies the part file from the part file staging area 208 to the pre-production repository 218. Upon successfully copying the file, PSPS deletes the file from the part file staging area 208.

The production engineering operator is notified whether the attempt to create the part is successful. If not successful, the operator is notified where the error occurred.

After the part number and part file have been established in PSPS, the part number information may be deleted. However, if the part is being used in the current build schedule, the part may NOT be deleted. In order to delete a part in PSPS, the production engineering operator must be configured with a role which allows part configuration. To delete a part, the operator must click on the Configure Part icon or select Configure Part from the Tools menu on the main screen.

To delete part information, the production engineering operator must enter a part number and clicked on the Find action button to select the part. Once the operator has pressed the Find action button, PSPS displays a list of parts and allow the operator to select the desired part. To delete the selected part, the operator clicks on a Delete action button.

If the part is being used in the current build schedule, PSPS displays an error message explaining that the part cannot be deleted while it is still in use. If the part can be deleted, PSPS displays a screen which contains the part information associated with the part to be deleted.

After the production engineering operator has verified that this is the correct part to delete, he/she should click on the OK action button to delete the part information. Upon successful removal, PSPS removes the file from the production staging area 206 and copies it to an obsolete directory.

The operator is notified whether the attempt to delete the part is successful. If not successful, the operator is notified where the error occurred.

2. Product Engineering Component 504 and Releasing Component 510

Once a part has been configured, it may be released into production. A part can not be used by PSPS until it has been released. PSPS can not use a released part until it is specifically called out in the machine build schedule.

With reference to FIG. 8, upon selection of the Release Part option from the main menu, PSPS displays the Release Part screen 802. The release operator selects whether to release the part to production or to the part center by clicking on the appropriate radio button 804. The operator is then allowed to enter a part number (or a piece of a part number) and click on a Find action button 806. PSPS displays a list of parts which match the part number entered. If the release to production radio button is selected, the list of part numbers displayed to the operator only contains parts that have not been released. If the release to Parts radio button is selected, the list of part numbers contains all parts.

Once a part has been selected, the part's information is displayed to the release operator for review. No changes to the part information are allowed. If the operator wishes to release the part, he/she clicks on an OK action button 808 and the appropriate action will be taken. If the operator wishes to exit the screen, he/she clicks on a Cancel action button 810. If at any time, the operator wishes to clear the information on the screen and start over, he/she clicks on a Reset action button 812.

The release operator is notified whether the attempt to release the part is successful. If not successful, the operator is notified where the error occurred.

3. Scheduling Component 506

PSPS requires that a build schedule exist in the database for use by the assembly operators to load software onto and print labels for a machine. The build schedule can be loaded into PSPS in two ways: batch processing and manual loading.

With reference to FIG. 9, manual loading of a build schedule will now be discussed. Upon selection of the Load Schedule option from the main menu, PSPS displays the Load Schedule screen 902. At this point, the operator can create a new build schedule from scratch by selecting the New option from the File menu, or opening an existing build schedule by selecting the Open option from the File menu.

A top portion 904 of the screen is a hierarchy browser and contains a list of machines currently defined in the build schedule file. A bottom portion 906 of the screen contains the build schedule information for each of the machines listed in the top portion 904. If this is a new build schedule, there will not be any machines to display.

Upon selection of a machine, the selected machine's build information is displayed in the lower portion 906 of the screen. To see more detail about the machines contents. The schedule operator double clicks on the machine in the top portion 904 and a list of the ECM's for the machine appears under the machine in the top portion 904. Once a machine has been expanded to display its contents, the lower portion 906 of the screen contains information about the ECM's contained in the machine.

The available ECM elements include: source, configuration, or flash files to be loaded (denoted by a software icon); component data to be loaded (denoted by a component icon), and ECM and diskette labels (denoted by a label icon).

Upon selection of an ECM element, only the selected element's information is displayed in the lower portion of the screen. Since an ECM element is the lowest level in the hierarchy, double clicking on it will not cause anything to occur.

In order to edit a machine, ECM, or ECM element's information, the schedule operator selects the object (or its expanded container) and makes the changes in the lower portion of the screen. Once the operator has completed editing a particular object or section of objects, he/she must implement the changes by clicking on an Apply action button (not shown). The Apply action button is only be available when there are changes to be implemented.

In order to add a machine, ECM, or ECM element, the operator must select the object to which the new item should be added (e.g., to add an ECM, select the machine that the ECM should be added to) and select an Add action button 908 PSPS displays a screen for the operator to enter the new item's information. Upon completion of entering the new item's information, the operator will click on an OK action button, and the item is added to the hierarchy browser and the lower portion 906 the screen.

In order to delete a machine, ECM, or ECM element, the schedule operator selects the object to be deleted and clicks a Delete action button 910. Deletion of an element automatically deletes all of its subordinates.

Tool bar icons may be included which correspond to the Edit menu to add or delete build schedule information.

Once a build schedule has been completed, it may be saved or loaded. To save the build schedule file, the operator selects Save or Save As from the File menu. All build schedule files automatically contain a file extension of BLD.

To load a build schedule into PSPS, the schedule operator selects a Load option from the Options menu. PSPS loads the build schedule on the screen. Once a machine has begun being flashed on the assembly line, a label has been printed, or component data has been loaded, PSPS will not allow changes to be made to the machine's information. A warning is issued if the machine has been downloaded to a laptop. During the load of a build schedule file, a machine will not be processed if one of the following conditions occur:

- Attempting to add a machine whose information already exists in the database.
- Attempting to change or delete a machine whose information does not exist in the database.
- Attempting to add or change a machine whose software or label part number does not exist in the database or has not been released to production.
- Attempting to add, change, or delete a machine that has already begun to be processed, downloaded to a laptop, or has data which is being overridden.

If an error occurs during the loading of one or more machines in the build schedule, the machine(s) are written to a grief file and the operator will be notified so that he/she can resolve the grief. Grief files will be written to the build schedule staging area with a file name of MMDDHHmm.BLD where MM is the current month, DD is the current day, HH is the current hour, and mm is the current minute when the first grief situation occurred during the load.

To exit the Schedule Load screen, the operator selects the Exit option from the File menu.

4. Assembly Component 508

Once a machine's contents has been established in PSPS, it may be used to load the correct part files, load the correct component data, and/or print the correct ECM or diskette labels.

Figure 10:
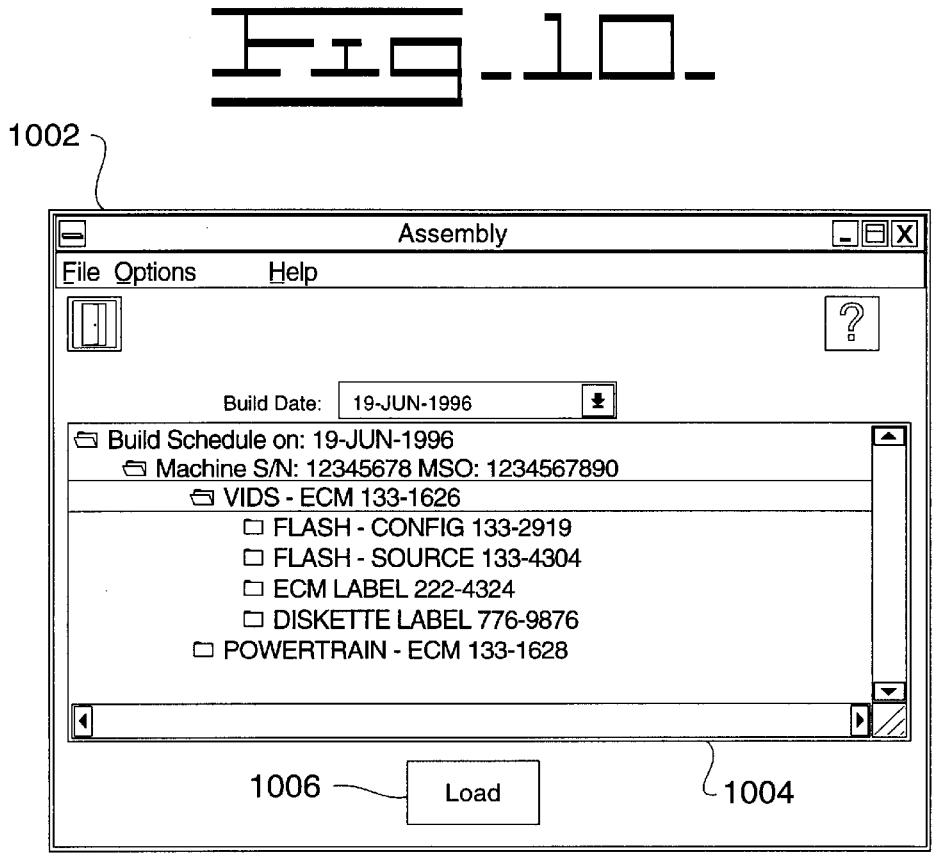
FIG. 10 is a diagrammatical view of a Assembly screen of the present invention.

With reference to FIG. 10, upon selection of Assembly Load option from the main menu, PSPS displays the Load Schedule screen 1002. The Assembly Load screen contains a list 1004 of all the machines configured for this location ordered by the build sequence number for the build schedule date selected. The first machine in the list is automatically selected. The assembly operator selects a different machine to load by clicking on another machine within the same build date or selecting another build date and machine. The assembly operator expands or contracts the machine's contents by double clicking on the machine in the list 1004.

In order to load a machine, the assembly operator confirms that the correct machine (based on machine serial number) is selected and then clicks on a Load action button 1006. A configurable verification screen (not shown) appears which asks the assembly operator to confirm that the correct machine has been selected.

If the assembly operator confirms that the correct machine was selected by pressing an OK action button on the verification screen, all ECM's that are configured to be loaded at this location is loaded (and tags printed if specified).

Figure 11:
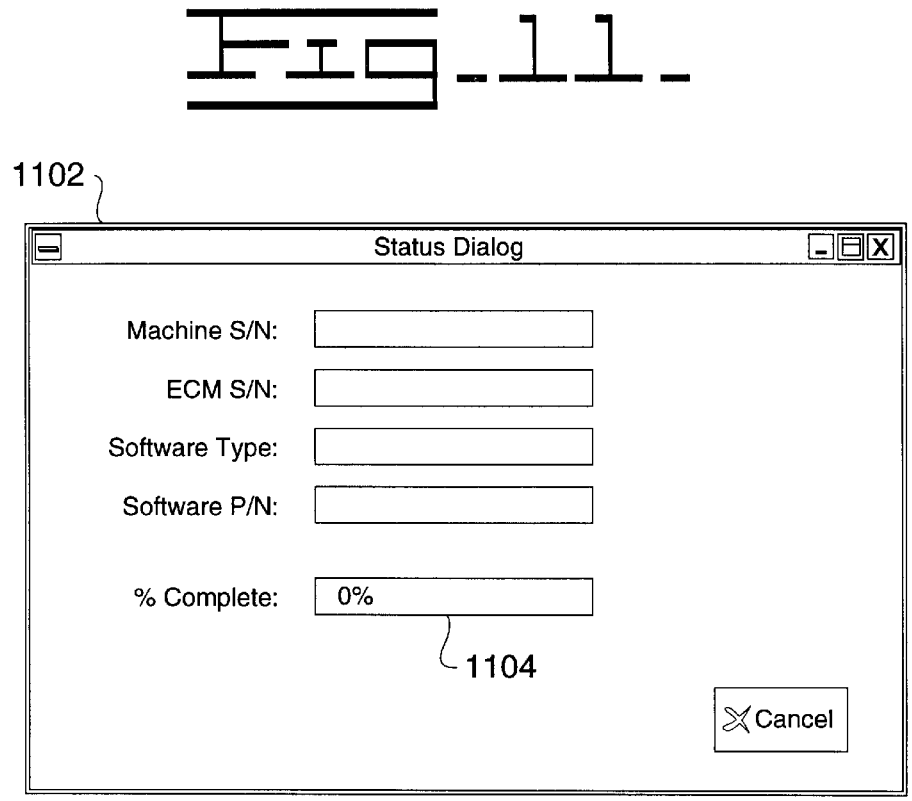
FIG. 11 is a diagrammatical view of a Status Dialog of the present invention.

With reference to FIG. 11, a progress bar 1104 on a status dialog box 1102 is displayed to the operator for each element loaded or printed.

If any part of the load failed, the load process stops and the operator is informed of the error. A configurable amount of retries are attempted before the stopping the load process. After the load process has completed (successfully or otherwise), the Assembly Load display 1004 is updated to remove the elements of machine that have been successfully loaded. If all elements configured for this location were successfully loaded on the machine, the machine is removed from the display 1004 and the next machine in the schedule is automatically be selected.

The assembly operator may elect to load one ECM within a machine by selecting the ECM within the expanded machine's contents and pressing the Load action button 1006. A verification screen (not shown) appears which asks the operator to confirm that the correct ECM has been selected. If the operator confirms that the correct ECM was selected by pressing an OK action button on the verification screen, all ECM elements for the selected ECM is loaded (and tags printed if specified). The Assembly Load screen 1002 is updated to remove all the ECM elements that were loaded successfully. If all elements were loaded successfully, the ECM is removed from the machine contents. If all ECM's configured for this location have been successfully loaded, the machine is removed from the display and the next machine in the schedule is selected.

The assembly operator may elect to load one element within an ECM by selecting the element within the expanded machine's contents and pressing the Load action button. A verification screen (not shown) appears (configurable) which asks the assembly operator to confirm that the correct ECM element has been selected. If the assembly operator confirms that the correct ECM element was selected by pressing the OK action button on the verification screen, the ECM element is loaded or printed. If the element was loaded/printed successfully, the element is removed from the ECM contents. If all elements for this ECM have been successfully loaded, the ECM is removed from the display. If all ECM's for this machine that are configured for this location have been successfully loaded, the machine is removed from the display and the next machine in the schedule is selected.

Prior to loading, the assembly operator may override software, component, and label data. To override the data, the assembly operator must expand the machine's contents by double clicking on the machine. Once the machine's contents have been expanded, the operator may select an ECM element to override by double clicking on the element. PSPS verifies that the operator has the authority to override assembly data. If the operator does not have the authority to override, PSPS displays a login screen so that someone with authority can log in and perform the override.

With reference to FIG. 12, once an authorized operator is logged in, an override screen 1202 appears. If the override is on a software or label element, only the part number can be overridden.

With reference to FIG. 13, if the override is on component data, an appropriate component data override screen 1302 is displayed.

Once the override has been performed, the database is updated, and the authorized operator (if not the original operator) is logged out.

Once any element on a machine has been successfully loaded, the Redo function must be used to reload/reprint that element. The Redo option is available from the main menu as well as from the Assembly Load screen.

With reference to FIG. 14, if the assembly operator selects the Redo Option, the assembly operator is asked for the machine serial number of the machine which needs something redone in a Redo dialog 1402.

Figure 15:
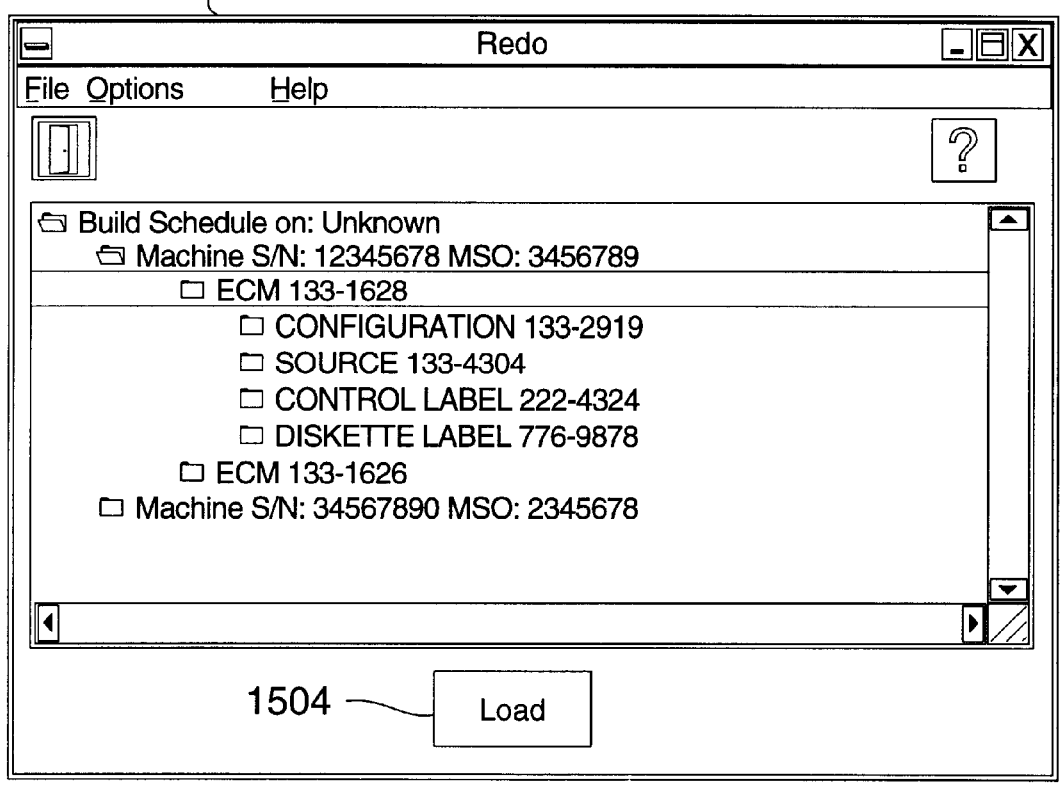
FIG. 15 is a diagrammatical view of a Redo screen of the present invention.

Once a machine serial number has been entered by the assembly operator, PSPS retrieves the last successful load of all elements matching the machine serial number. With reference to FIG. 15, a list of these elements is provided to the operator on an Assembly Redo screen 1502.

To redo a load or print operation, the operator selects an element to redo by single clicking on the element and press the Redo action button 1504. PSPS performs the load/print and reports back the results to the operator.

Prior to performing the redo, the operator may override data within the redo element. To override an element, the assembly operator double clicks on the element. PSPS verifies that the operator has the authority to override assembly data. If the operator does not have the authority to override, PSPS displays the login screen so that someone with authority can log in and perform the override. Once an authorized operator is logged in, an override screen appears (see above).

If the override is on a software or label element, only the part number can be overridden. If the override is on component data, the appropriate component data override screen appears (see FIG. 13 for transmission component data override). Once the override has been performed, the screen is updated, and the authorized operator (if not the original operator) is logged out.

5. Persistence Manager

The persistence manager 512 manages the databases in which the PSPS data is maintained. The persistence manager 512 couples the components and the databases. All access to and from the databases and the components are handled via the persistence manager 512.

6. Transportable

Once a machine's contents have been established in PSPS, it may be used to load the correct part files, load the correct component data, and/or print the correct ECM or diskette labels. If the machine to be loaded is out in the yard or at a location which cannot connect directly to the database on the server, a laptop (not shown) must be used. To prepare the laptop for use by PSPS, the required database and production repository files must be downloaded onto the laptop. To Download production data, the operator must select Download from the main menu or click on the Download icon.

Figure 16:
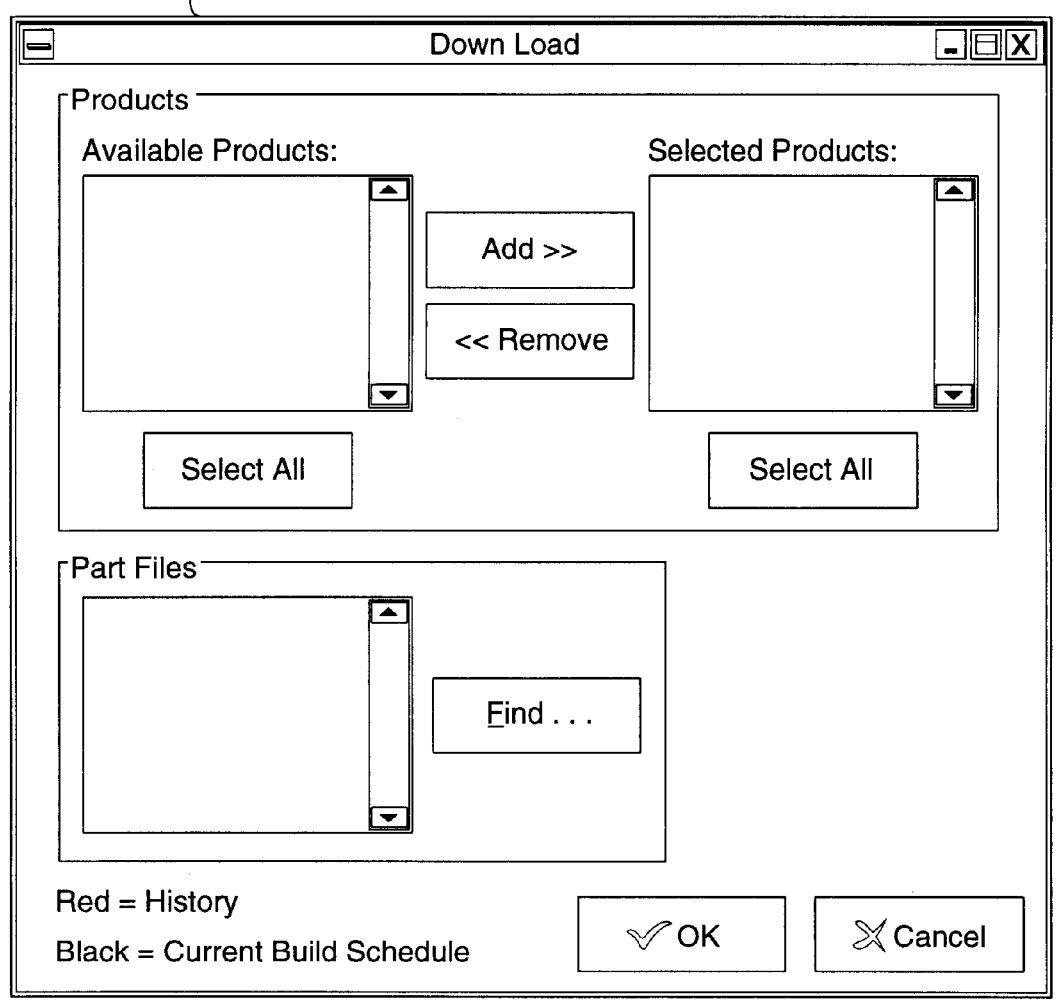
FIG. 16 is a diagrammatical view of a Down Load screen of the present invention.

With reference to FIG. 16, upon selecting the download option, a Download screen 1602 is displayed so that the operator can select the machines and part files to download. A list of machines (based on machine serial number) is provided for the operator to select from. Machines which are included in the current build schedule are displayed in black and machines that are only in history are displayed in red (for Redo).

To add a machine to the download list, the operator locates the machine's serial number and clicks on the machine to select it. To download all machines, click on the Select All button above the machine list. Then click on the Add action button to add the machine(s) to the download list. Whenever a machine is added to the download list, PSPS automatically adds the associated part files to the part file download list.

To add additional part files, for overrides to the original software specifications provided in the build schedule, click on the Find action button and select the part to include. In order to select additional part files, the operator must know the part number, change level, and version of the part.

Once all the production data to download has been selected, the operator clicks on the OK action button to begin the download.

INDUSTRIAL APPLICABILITY

With reference to the drawings and in operation, the present invention provides a system and method for producing production software. The present invention is embodied in a computer network which ties together several groups in the production process.

The system is composed of several components. The design group uses a design component 502 for placing new computer program files into the system.

The product engineering group uses a product engineering component 504 and a releasing component 510 to review the new computer program files, approve the files for production and to set an effective production date.

A scheduling component 506 is used to schedule production of the machines containing the ECM's.

An assembly component 508 is used by assembly operators to select the correct software for all ECM's on a current build machine and to download the software onto each ECM.

Other aspects, features, and advantages of the present invention may be determined by a study of the specification, drawing, and appended claims.

What is claimed is:

1. A system for producing production control software for a plurality of electronic control modules, the electronic control modules being located on earthmoving machines for controlling machine operation, each machine having a subset of the electronic control modules, comprising:

a part file staging area for receiving and storing new production control software from a design engineering group;

a product engineering workstation coupled to the part file staging area, the product engineering workstation operated by a product engineering user, the product engineering user being able to review, modify and approve the new production control software, the product engineering workstation being adapted to produce approved production control software;

a production staging area coupled to the product engineering workstation for receiving and storing approved production control software and for receiving an order for production of an earthmoving machine;

a production workstation coupled to the production staging area for receiving the order, determining the subset of electronic control modules located on the ordered earthmoving machine, and retrieving approved production control software corresponding to the subset of electronic control modules located on the ordered machine, the production workstation being coupled to the ordered machine and adapted to download the production control software from the production staging area to the subset of electronic control modules located on the ordered machine.

2. A system, as set forth in claim 1, wherein the machine orders are processed in a batch mode.

3. A system, as set forth in claim 1, wherein the machine orders are processed interactively with an operator.

4. A system, as set forth in claim 1, wherein the production control software is transferred within the system using file transfer protocol.

5. A system, as set forth in claim 1, wherein a product engineering group provides a sequential file containing a plurality of orders for production of earthmoving machines.

6. A system, as set forth in claim 5, wherein the sequential file contains orders for the next 3–5 days.

7. A system, as set forth in claim 1, wherein the order includes a transaction type.

8. A system, as set forth in claim 7, wherein the transaction type is one of an ADD, CHANGE, or DELETE value.

9. A system, as set forth in claim 1, wherein the order includes a shipping order number.

10. A system, as set forth in claim 1, wherein the order includes a serial number.

11. A system, as set forth in claim 1, wherein the order includes a build date.

12. A system, as set forth in claim 1, wherein the order includes a build sequence number.

13. A system, as set forth in claim 1, wherein the order includes a unique part number associated with the earthmoving machine.

14. A system, as set forth in claim 1, wherein the order includes a change level number.

15. A system, as set forth in claim 1, wherein the order includes an engineering model associated with the machine.

16. A system, as set forth in claim 1, wherein the order includes a sales model associated with the machine.

17. A system, as set forth in claim 1, wherein the order includes an ECM type associated with each ECM on the machine.

18. A system, as set forth in claim 17, wherein the ECM type is one of a ENGINE, IMPLEMENT, POWERTRAIN, SERVICE GROUP, or information manager type.

19. A system, as set forth in claim 1, wherein the order includes an ECM part number associated with each ECM on the machine.

20. A system, as set forth in claim 1, wherein the order includes an ECM class code.

21. A system, as set forth in claim 1, wherein the order includes an ECM change level.

22. A system, as set forth in claim 1, including a history staging area coupled to the production staging area for receiving and storing a history of the earthmoving machines and ECM's for which production control software was loaded.

23. A system, as set forth in claim 1, including a component staging area coupled to the production staging area, the component staging area containing a database of configuration files for specific components of the earthmoving machine.

24. A system, as set forth in claim 1, including a design engineering component implemented in software run on a design engineering workstation, the design engineering component adapted to allow the design engineering user to add production control software to the system.

25. A system, as set forth in claim 1, including a product engineering component implemented in software run on the product engineering workstation, the product engineering component adapted to allow the product engineering user to approve and modify production control software.

26. A system, as set forth in claim 1, including a release engineering component implemented in software run on the product engineering workstation, the product engineering component adapted to allow the product engineering user to release production control software and to give the production control software a release effective date.

27. A system, as set forth in claim 1, including an assembly component implemented in software run on the production workstation, the assembly component adapted to allow an assembly user to download the production control software to the ECM's located on the production machine.

28. A system for producing production control software for a plurality of electronic control modules, the electronic control modules being located on earthmoving machines, each machine having a subset of the electronic control modules, comprising:

a part file staging area for receiving and storing new production control software from a design engineering group;

a product engineering workstation coupled to the part file staging area, the product engineering workstation operated by a product engineering user, the product engineering user being able to review, modify and approve the new production control software, the product engineering workstation being adapted to produce approved production control software;

a production staging area coupled to the product engineering workstation for receiving and storing approved production control software in a pre-production repository and for receiving an order for production of an earthmoving machine in a build schedule staging area;

a release workstation coupled to the production staging area, the release workstation operated by a release user, the release user being able to determine an effective date of the approved control software, the release workstation being adapted to copy the approved control software from the pre-production repository to a production repository located at the production staging area on the effective date;

a production workstation coupled to the production staging area for retrieving the order from the build schedule staging area, determining the subset of electronic control modules located on the ordered machine, and retrieving the production control software corresponding to the subset of electronic control modules located on the ordered machine, the production workstation being coupled to the ordered production machine and adapted to download the production control software from the production repository to the subset of electronic control modules located on the ordered machine.

29. A method for producing production control software for a plurality of electronic control modules implemented in software on a network of computers, the electronic control modules being located on earthmoving machines, each machine having a subset of the electronic control modules, including the steps of:

receiving new control software from a design engineering group and storing the new control software;

producing approved production control software by allowing a product engineering user to review, modify and approve the new control software for production;

receiving and storing approved production control software and for receiving an order for production of an earthmoving machine;

receiving the order, determining the subset of electronic control modules located on the ordered machine, and retrieving the production control software corresponding to the subset of electronic control modules located on the ordered machine;

downloading the production control software from the production staging area to the subset of electronic control modules located on the ordered machine.

* * * * *